MICHAEL PINNER, OF BUFFALO, NEW YORK.

Letters Patent No. 83,539, dated October 27, 1868.

IMPROVED ROOFING-COMPOUND.

The Schedule referred to in these Letters Patent and making part of the same.

*To all whom it may concern:*

Be it known that I, MICHAEL PINNER, of Buffalo, in the county of Erie, and in the State of New York, have invented certain new and useful Improvements in Plastic and Adhesive Cement for Roofing; and do hereby declare that the following is a full, clear, and exact description thereof.

The nature of my invention consists in preparing a material or compound which is, to a certain degree, plastic, yet sufficiently hardened so as not to be affected by heat or cold, and which is alike impervious to and insoluble in water or oil, and which will firmly adhere to wood, brick, or stone.

In order to enable others skilled in the art to which my invention appertains to make and use the same, I will now proceed to describe its construction and operation.

The component parts of the cement are, asphaltum, or condensed coal or gas-tar, slaked limed, sulphur, sand, and baryta, in the following proportions:

Forty per cent. asphaltum, or condensed coal or gas-tar; thirty-five per cent. fresh-slaked lime; five per cent. sulphur; fifteen per cent. sharp sand; five per cent. baryta; the whole to be thoroughly heated and mixed.

The slaked lime and sulphur are added for the purpose of hardening the cement. Greater or smaller proportions of lime and sulphur are added, as a cement of greater or less hardness is required.

Baryta added, whilst the asphaltum and sulphur are melted and in a heated state, chemically combines with these articles, and contributes materially to the vulcanizing and hardening of the cement, makes it a water-repellant, and prevents its being affected by either the extreme cold or heat of the atmosphere.

This cement is applicable for the roofing of buildings and railroad-cars, covering of walls and sides of buildings, boat-decks, making of sidewalks, lining of water-cisterns, oil-tanks, cementing together of paving-stones in streets, and a variety of other purposes.

I am aware that some of the ingredients used by me have been employed for similar purposes, separately, or in combination with various other substances.

Having thus fully described my invention,

What I claim as new, and desire to secure by Letters Patent, is—

A cement composed of the ingredients above specified, in substantially the proportions and for the purposes set forth.

In testimony that I claim the foregoing, I have hereunto set my hand, this 4th day of August, 1868.

M. PINNER.

Witnesses:
- M. B. SHERWOOD,
- JOSEPH LESSLER.